US010132431B2

(12) United States Patent
Fujii et al.

(10) Patent No.: US 10,132,431 B2
(45) Date of Patent: Nov. 20, 2018

(54) PIPE CONNECTING DEVICE

(71) Applicant: Nippon Pillar Packing Co., Ltd., Osaka-shi, Osaka (JP)

(72) Inventors: Makoto Fujii, Osaka (JP); Toshihide Iida, Osaka (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 83 days.

(21) Appl. No.: 14/888,140

(22) PCT Filed: Mar. 24, 2014

(86) PCT No.: PCT/JP2014/058002
§ 371 (c)(1),
(2) Date: Oct. 30, 2015

(87) PCT Pub. No.: WO2014/181590
PCT Pub. Date: Nov. 13, 2014

(65) Prior Publication Data
US 2016/0061357 A1    Mar. 3, 2016

(30) Foreign Application Priority Data

May 8, 2013  (JP) .................................. 2013-098312

(51) Int. Cl.
*F16L 47/04*   (2006.01)
*F16L 13/14*   (2006.01)
(Continued)

(52) U.S. Cl.
CPC ............. *F16L 13/147* (2013.01); *F16L 15/08* (2013.01); *F16L 19/028* (2013.01); *F16L 33/223* (2013.01); *F16L 47/04* (2013.01)

(58) Field of Classification Search
CPC ....... F16L 19/028; F16L 33/223; F16L 47/07; F16L 47/04
See application file for complete search history.

(56) References Cited

U.S. PATENT DOCUMENTS 3,210,101 A    10/1965  Bahr
4,951,976 A     8/1990  Boelkins
(Continued)

FOREIGN PATENT DOCUMENTS

FR    348562 A  *  4/1905  ............ F16L 33/223
FR   1032711 A  *  7/1953  ............ F16L 33/223
(Continued)

OTHER PUBLICATIONS

International Search Report, dated Jun. 17, 2014 (Jun. 17, 2014).

*Primary Examiner* — David Bochna
*Assistant Examiner* — James A Linford
(74) *Attorney, Agent, or Firm* — Rankin, Hill & Clark LLP

(57) ABSTRACT

A pipe-connecting device includes: an inner ring having: an outer circumferential portion having a tip-contracted outer-circumferential flared surface that is to be press-inserted into an end portion of a tube to flare the tube, and an inner circumferential portion constituting a fluid transfer path; a pipe joint body that has a tubular screwing portion having an external thread; and a union nut having an internal thread that is screwed with the external thread. The inner ring including the tube is inserted into the tubular screwing portion, and the tip-contracted outer-circumferential flared surface is pressed through the tube by a pressing portion of the union nut. The pressing portion of the union nut is formed into an inclined inner circumferential surface that is inclined in the same direction as the tip-contracted outer-circumferential flared surface with respect to the axis of the tubular screwing portion.

3 Claims, 7 Drawing Sheets

(51) Int. Cl.
*F16L 19/028* (2006.01)
*F16L 33/22* (2006.01)
*F16L 15/08* (2006.01)

(56) References Cited

U.S. PATENT DOCUMENTS

| | | | | |
|---|---|---|---|---|
| 5,388,871 | A | 2/1995 | Saitoh | |
| 5,743,572 | A | 4/1998 | Nishio | |
| 5,951,060 | A * | 9/1999 | Fukano | F16L 19/028 |
| | | | | 285/332 |
| 6,045,164 | A | 4/2000 | Nishio | |
| 6,089,621 | A * | 7/2000 | Nishio | F16L 19/041 |
| | | | | 285/331 |
| 6,776,440 | B2 * | 8/2004 | Nishio | F16L 47/04 |
| | | | | 285/247 |

FOREIGN PATENT DOCUMENTS

| | | | | |
|---|---|---|---|---|
| GB | 1277718 | | 6/1972 | |
| JP | 50-109214 | | 9/1975 | |
| JP | H03-168495 | | 7/1991 | |
| JP | 6-14674 | | 2/1994 | |
| JP | 10-54489 | | 2/1998 | |
| JP | 11-218272 | | 8/1999 | |
| JP | WO 0028254 | A1 * | 5/2000 | F16L 33/223 |
| JP | 2012-193758 | | 10/2012 | |
| JP | 2013-100874 | | 5/2013 | |

* cited by examiner

BASAL END SIDE ← → TIP END SIDE

BASAL END SIDE ←            → TIP END SIDE (a)

TIP END SIDE ← → BASAL END SIDE (b)

PIPE CONNECTING DEVICE

TECHNICAL FIELD

The present invention relates to a pipe-connecting device of the type which uses an inner ring, and more particularly to a pipe-connecting device which is preferred in piping for a liquid having high purity or ultrapure water that is handled in various technical fields such as production of semiconductor devices, production of medical equipment and medicines, food processing, and chemical industry.

BACKGROUND ART

A pipe-connecting device using an inner ring is configured by: a tubular screwing portion which is projected from a pipe joint body or a fluid apparatus in a state where an external thread is formed on the outer circumference; a seal inner ring in which an annular large-diameter portion is raised on the radially outward side; and a union nut in which an internal thread to be screwed with the external thread is formed. For example, the pipe-connecting device disclosed in Patent Literature 1 is known.

The pipe-connecting device disclosed in Patent Literature 1 includes: a tubular screwing portion which is disposed in a pipe joint body in a state where an external thread is formed on the outer circumference; an inner ring in which an inner circumferential portion is formed as a fluid passage, and an annular large-diameter portion is raised on the radially outward side, and which is used for fixing a pipe; and a union nut in which an internal thread to be screwed with the external thread is formed.

In the above-described pipe-connecting device, when a tube is to be connected to the pipe joint body, the inner ring is firstly press-inserted into an end portion of the tube from an opening of the tube, and the end portion of the tube is flared and deformed by the annular large-diameter portion. Next, the tube which is flared and deformed, and which has the inner ring is inserted into the tubular screwing portion.

Next, the internal thread of the union nut is screwed with the external thread of the tubular screwing portion. Then, the union nut is fastened and crew-advanced, and this screw advancement causes the union nut to press the tube having the inner ring in the axial direction, thereby performing the connection of the tube.

In a pipe-connecting device such as the above-described one, means was employed which is based on the concept that the union nut is fastened to strongly press the flared portion of the tube in the axial direction to a degree by which the portion is recessed, by the seal pressing portion (see the pressing edge 3C in Patent Literature 1) that is a pointed place, thereby performing a sealing function.

In order to ensure the seal performance and the security against the slipping off of the tube, namely, a strong fastening work using a tool is required. Therefore, there are difficulties such as a large burden on the worker, a difficulty of a work in a confined space, and occurrence of working variation. In some cases, there is a possibility that the performance may be affected by insufficient fastening.

Moreover, strong fastening causes large stress to be applied to various portions, and the deformation is increased. In order to prevent loosening due to a long-term use or a use at a high temperature from occurring, therefore, a refastening operation is sometimes performed. In the case where detachment or reconstruction is performed in accordance with component replacement or maintenance, it is necessary to conduct the fastening operation at a degree which is higher than that of the previous fastening operation. In a conventional pipe-connecting device, therefore, there remains room for improvement in repeated uses, such as that the fastening position or the number of uses is often limited, and that, in a place where detachment is frequently performed, component replacement must be immediately performed.

PRIOR ART LITERATURE

Patent Literature

Patent Literature 1: Japanese Patent Application Laid-Open No. 10-054489

SUMMARY OF THE INVENTION

Problems to be Solved by the Invention

It is an object of the invention to provide a pipe-connecting device which is of the type using an inner ring, and which, while maintaining a satisfactory seal performance, is improved so as to be repeatedly used times larger than those in the conventional art, by revising the structure.

Means for Solving the Problems

In the invention of claim 1, a pipe-connecting device in which the device includes: an inner ring 3 having: an outer circumferential portion 3G in which a tip-contracted outer-circumferential flared surface 3a that is to be press-inserted from a tip end into an end portion 4C of a fluid transfer tube 4 to flare an inner circumferential portion of the end portion 4C of the tube 4 is formed at the tip end; and an inner circumferential portion 3w constituting a fluid transfer path;

a pipe joint body 1 or fluid apparatus 1 that has a tubular screwing portion 1A in which an external thread 7 is formed on an outer circumferential side; and a union nut 2 in which an internal thread 13 that is screwed with the external thread 7 of the tubular screwing portion 1A is formed, the inner ring 3 is inserted into the tubular screwing portion 1A in a state where the inner circumferential portion of the end portion 4C of the tube 4 is flared, and the outer-circumferential flared surface 3a is pressed against the union nut 2 which is screwed with the external thread 7 of the tubular screwing portion 1A, in a state where the tube 4 is clamped, is characterized in that a pressing portion 12b which is in the union nut 2, and which presses the tube 4 against the outer-circumferential flared surface 3a is formed into an inclined inner circumferential surface which is inclined in a same direction as the outer-circumferential flared surface 3a with respect to an axis Y of the tubular screwing portion 1A.

In the invention of claim 2, in the pipe-connecting device of claim 1, it is characterized in that the outer-circumferential flared surface 3a is set to a state where, in the inner circumferential portion of the end portion 4C of the tube 4 to be flared, a portion which is to be flared at a maximum is only to be flared at a maximum, and formed into a state where a diameter is larger than a natural tip-contracted inner circumferential flared surface 4u which appears at this time, and which is in the inner circumferential portion of the end portion 4C of the tube, and a convex curved surface is formed.

In the invention of claim 3, in the pipe-connecting device of claim 1, it is characterized in that an angle θ of the inclined inner circumferential surface 12b with respect to the axis Y is set to be larger than an angle α of the outer-circumferential flared surface 3a with respect to the axis Y.

In the invention of claim 4, in the pipe-connecting device of claim 1, it is characterized in that a minimum diameter r of the pressing portion 12b is set to be equal to or larger than a minimum diameter n of a press fitting portion M between the outer-circumferential flared surface 3a and the tube 4.

In the invention of claim 5, in the pipe-connecting device of claim 1, it is characterized in that the device is configured so that inner seal portions S2, S3 due to press contact between a seal element portion y which is formed in a basal end side of the inner ring 3, and a seal configuring portion k which is disposed in the pipe joint body 1 or the fluid apparatus 1 are able to be formed.

Effects of the Invention

According to the invention of claim 1, by fastening (screw advancement) caused by turning of the union nut, the pressing portion is caused to axially press a portion which is in the end portion of the tube, and which is fitted onto the outer-circumferential flared surface. The pressing portion is an inclined inner circumferential surface which is inclined in the same direction as the outer-circumferential flared surface, and configured so as to press the tube by a wide surface. According to the configuration, the pressing force (surface pressure) by which the tube is pressed can be explicitly reduced as compared with the conventional configuration where local pressing is performed by a pointed edge. Therefore, it is possible to reduce the creep phenomenon.

In a pipe-connecting device having a structure where a tube which is forcedly fitted onto an inner ring is fitted into a pipe joint body, a satisfactory seal performance is originally provided. Therefore, it has been known that there is no distinct difference in seal performance between the conventional configuration in which the pressing portion of the union nut is pointed and pressed against a tube while biting thereinto, and the configuration of the application in which the whole of a tube is pressed by the wide inclined inner circumferential surface. According to the configuration of claim 1 in which measures to avoid stress concentration and reduce the surface pressure are taken, therefore, the deformation and creep of a tube can be reduced, and hence it is possible also to distinctly increase the number of repeated uses.

As a result, it is possible to provide a pipe-connecting device which is of the type using an inner ring, and which, while maintaining a satisfactory seal performance, can be improved so as to be repeatedly used times larger than those in the conventional art, and prolong the life period, by revising the structure.

According to the invention of claim 2, although described in detail in the paragraph of embodiments, a wide range of the outer-circumferential flared surface of the inner ring is in contact with the inner circumferential portion of the tube, and a press-contact portion which is so wide as to extend over the whole of the outer-circumferential flared surface of the inner ring can be formed between the outer-circumferential flared surface and the inner circumferential portion of the tube.

Namely, the outer-circumferential flared surface of the inner ring and the end portion of the tube are already in close contact with each other prior to fastening of the union nut. Even when the pressing force applied by the union nut is weaker than that in the prior art, therefore, sufficient seal and tube slipping-off preventing performances are obtained. Consequently, the deformation of the tube end portion due to pressing can be minimized, and the above-described effects of the invention of claim 1 can be enhanced.

According to the invention of claim 3, the angle of the inclined inner circumferential surface with respect to the axis is set to be larger than that of the outer-circumferential flared surface with respect to the axis. In the portion which is in the tube that is fitted onto the tip-contracted outer circumferential flared surface of the inner ring, and which is pressed by the inclined inner circumferential surface (pressing portion), therefore, the amount of compression in the thickness direction of the tube is further increased as closer to the side opposite to the pipe joint body in the axial direction.

The compression amount of the tube is larger as further advancing toward the small-diameter side, whereby a wedge action is produced, and the effect of preventing the tube from slipping off can be further enhanced.

According to the invention of claim 4, the minimum diameter of the inclined inner circumferential surface is set to be equal to or larger than that the press fitting portion between the outer-circumferential flared surface and the tube. Therefore, a wasted operation of pressing a portion where the outer-circumferential flared surface and the tube end portion are not in close contact with each other, by the union nut can be omitted, and an unnecessary pressing force is not applied. The screw advancement due to fastening of the union nut can be efficiently performed.

Therefore, the union nut can be fastened by a force smaller than that in the prior art, and the workability can be improved.

According to the invention of claim 5, inner seal portions due to press contact between the seal element portion which is formed in the basal end side of the inner ring, and the seal configuring portion which is disposed in the pipe joint body can be formed. Therefore, a sufficient seal performance is provided by the inner seal portions. As a result, in the configuration of the portion where the tube is pressed by the pressing portion, also effects such as that a design which is more focused on prevention of slipping off of the tube is enabled, and that the seal performance is further enhanced can be attained.

MODE FOR CARRYING OUT THE INVENTION

Hereinafter, embodiments of the pipe-connecting device of the invention will be described with reference to the drawings. In a pipe-connecting device A shown in FIGS. 1 and 5, four axes, i.e., the axis Y of a pipe joint body 1, the axis Q of a union nut 2, the axis P of an inner ring 3, and the axis X of a tube 4 are drawn so that they are identical ones arranged on the same straight line (the axis Y=the axis Q=the axis P=the axis X).

Figure 1:
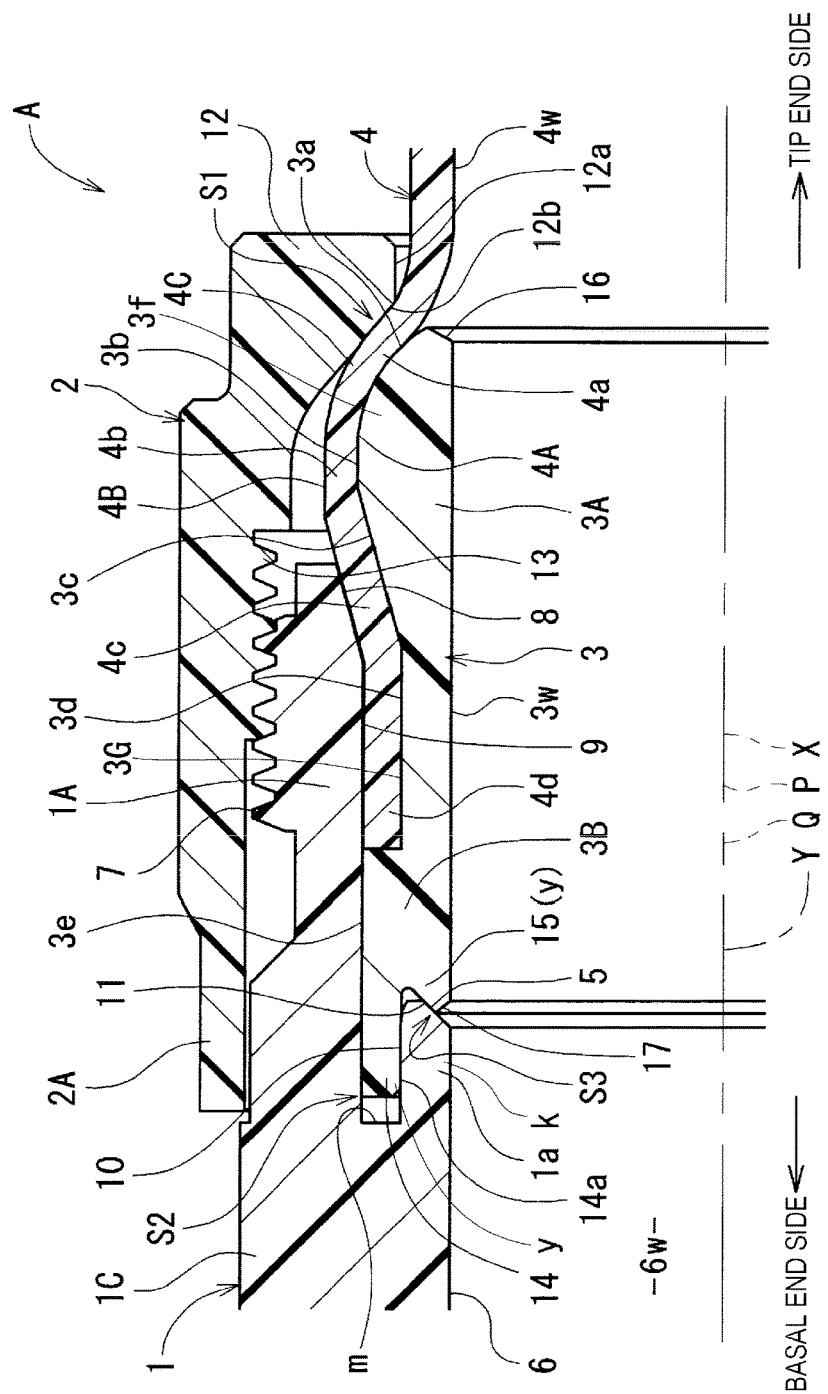
FIG. 1 is a sectional view of main portions showing a pipe-connecting device in a fastened state (Embodiment 1).
Figure 5:
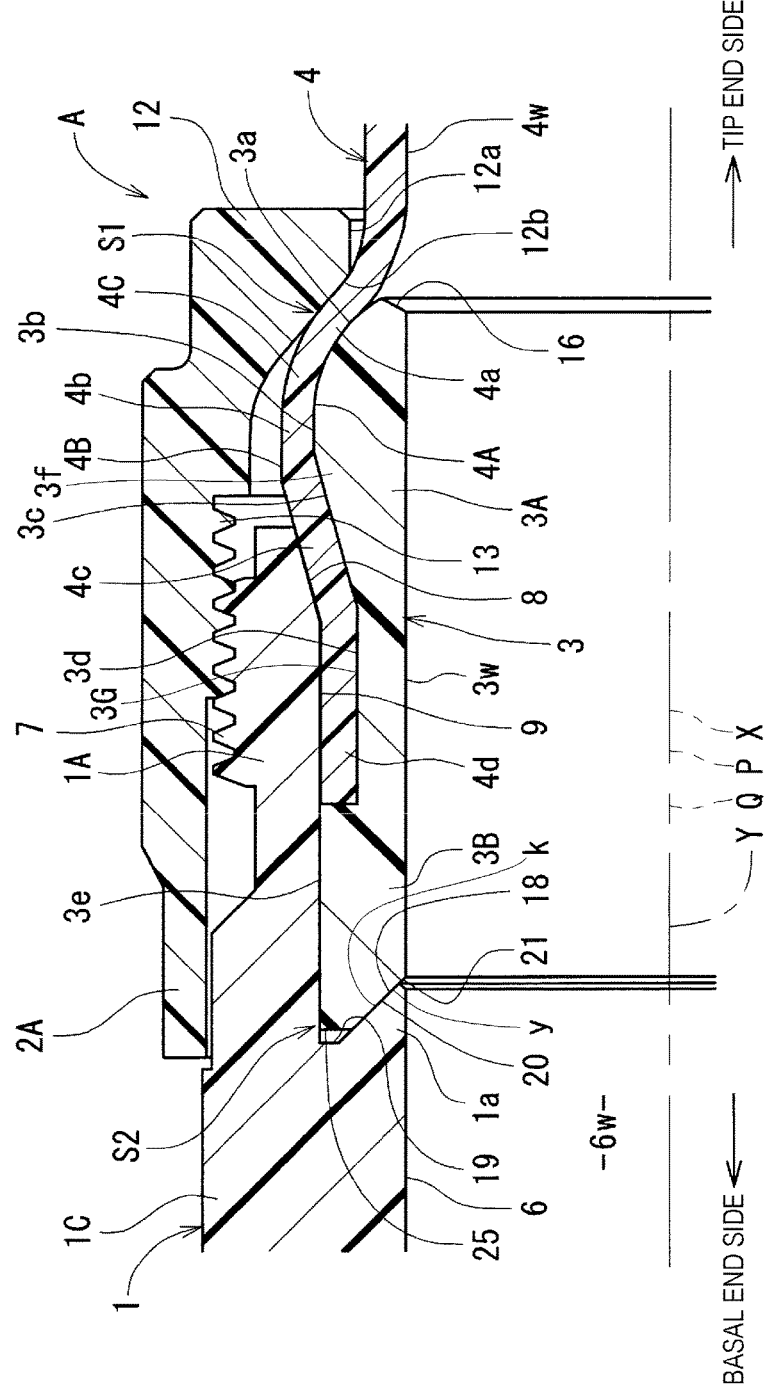
FIG. 5 is a sectional view of main portions showing a pipe-connecting device having another structure (Embodiment 2).

In the specification, it is defined that "tip end side" and "tip end" in components or the pipe joint body 1, the union nut 2, the inner ring 3, and the tube 4 indicate the side (or the direction) in which the tube 4 separates from the pipe joint body 1 in the direction of the axis Y in FIGS. 1, 5, and the like, and "basal end side" and "basal end" indicate the side (or the direction) in which the tube 4 approaches the pipe joint body 1 in the direction of the axis Y.

Embodiment 1

As shown in FIG. 1, the pipe-connecting device A is configured by a pipe joint through which tubes are connected to each other, has the pipe joint body 1, the union nut 2, and the inner ring 3, and is used for communicatingly connecting the tube 4 in a state where the inner ring body 3A is press-inserted into a tube end portion 4C of the tube 4. All of the pipe joint body 1, the union nut 2, the inner ring 3, and the tube 4 are made of a resin such as a fluorine resin (for example: PTFE, PFA, ETFE, CTFE, or ECTEF) having excellent heat resistance and chemical resistance. When the pipe joint body 1, the inner ring 3, and the tube 4 are made of the above-mentioned fluorine resin, the union nut 2 may be formed by a resin such as polyamide, polypropylene, or polyethylene. All of the pipe joint body 1, the union nut 2, the inner ring 3, and the tube 4 may be formed by a resin such as polyamide, polypropylene, or polyethylene.

Figure 4:
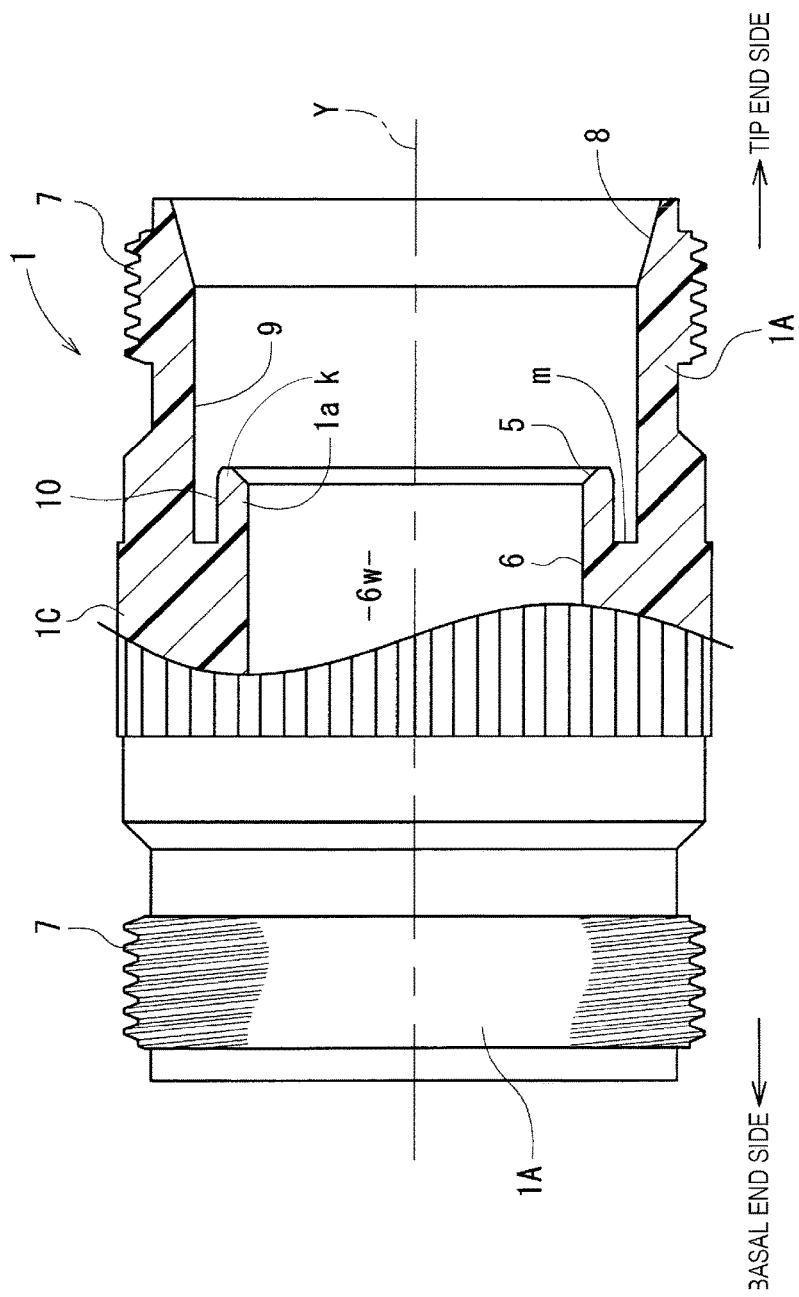
FIG. 4 is a partially fragmentary side view showing a pipe joint body.

As shown in FIGS. 1 and 4, the pipe joint body 1 has a tubular structure having: a tubular trunk portion 1C; a tubular screwing portion 1A which is disposed in its tip end side in the direction of the axis Y; a small-diameter tubular portion 1a which is formed on the radially inward side on the basal end side of the tubular screwing portion 1A; and an inner circumferential surface 6 which constitutes an internal flow path 6w. Although not illustrated, for example, the pipe joint body is formed into a component having a shape which, also in the basal end side of the trunk portion 1C, has a tubular screwing portion 1A and a small-diameter tubular portion 1a, and which is symmetrical in the axial direction.

In the tubular screwing portion 1A, an external thread 7 is formed from the outer circumference of its tip end portion toward the basal end side, a tip-expanded inner circumferential surface 8 is formed on the inner circumference of its tip end portion, and a linear inner circumferential surface 9 having a constant diameter is formed on the basal end side of the inner circumferential surface 8.

A linear outer circumferential surface 10 having a constant diameter is formed on the radially outward side of the small-diameter tubular portion 1a, and an inclined inner circumferential surface 5 having a tip-expanded shape in which the diameter is gradually increased as further advancing toward the tip end side of the small-diameter tubular portion 1a is formed in a tip end portion on the radially inward side of the small-diameter tubular portion 1a.

A tubular annular groove m is formed between the outer circumferential surface 10 of the small-diameter tubular portion 1a and the inner circumferential surface 9 of the tubular screwing portion 1A.

Figure 3:
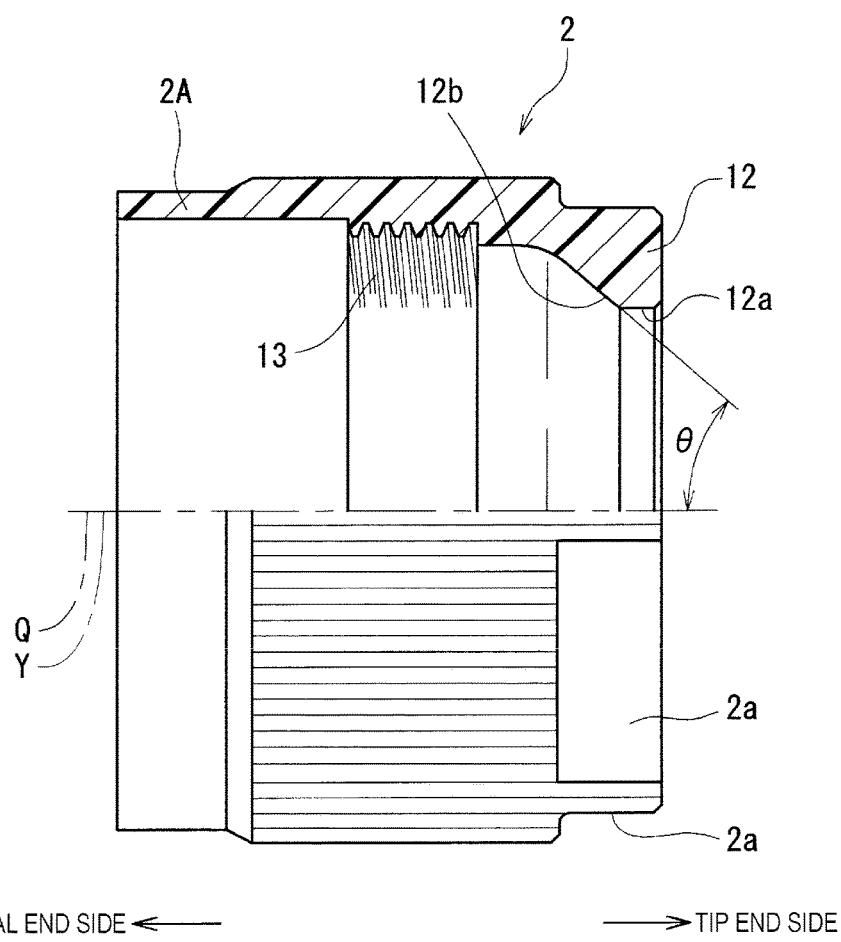
FIG. 3 is a partially fragmentary side view showing a union nut.

As shown in FIGS. 1 and 3, the union nut 2 is configured by a resin-made nut, and, in an inner circumferential portion, has an internal thread 13 which is screwed with the external thread 7 of the tubular screwing portion 1A, and an annular flange portion 12 which is located on the tip end side with respect to the internal thread 13, and which projects toward the radially inner side.

The inner diameter portion of the flange portion 12 is set as an inner circumferential surface 12a in which the diameter is slightly larger than the outer diameter of the tube 4 so that the tube 4 can pass therethrough. The basal end side of the flange portion 12 is configured as a pressing portion 12b that presses the tip-end side outer circumferential surface of the end portion 4C of the tube 4 into which the inner ring body 3A is press-inserted, in the direction of the axis Q of the union nut 2. In the outer circumference of the flange portion 12, six cut-shaped flat surfaces 2a which exhibit a substantially hexagonal shape as seen in the direction of the axis Q are formed so that turning by a spanner (wrench) is enabled.

The pressing portion 12b is formed as an inclined inner circumferential surface in which the base is widened so that the diameter is further increased as further approaching toward the side (basal end side) of the internal thread 13 in the direction of the axis Q. Specifically, the pressing portion 12b of the union nut 2 which clamps and presses tube 4 with an outer-circumferential flared surface 3a of the inner ring 3 is formed into an inclined inner circumferential surface which is inclined in the same direction as the outer-circumferential flared surface 3a with respect to the axis Q.

When the internal thread 13 is screwed with the external thread 7 of the tubular screwing portion 1A and the union nut 2 is screw-advanced, the pressing portion 12b presses the tip-end side outer circumferential surface of the end portion 4C of the tube 4 in the direction of the axis Q. The inner circumferential surface 12a of the flange portion 12 has a constant inner diameter, but may be formed into a tapered inner circumferential surface in which the inner diameter is gradually further increased as further separating from the internal thread 13.

Figure 2:
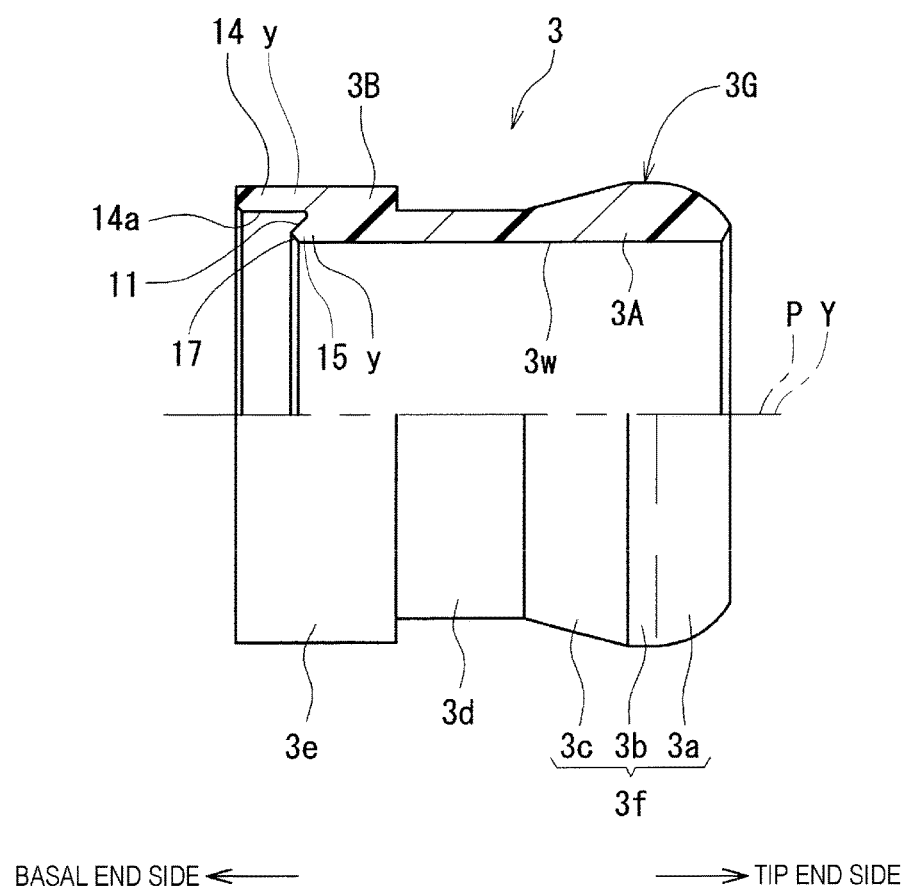
FIG. 2 is a partially fragmentary side view showing an inner ring.

As shown in FIGS. 1 and 2, the inner ring 3 is configured as a tubular member which has the inner ring body 3A that is press-inserted into the end portion 4C of the tube 4 from an opening of the tube 4, and a fitting tubular portion 3B that is on the basal end side of the inner ring body 3A, and that projects from the opening of the tube 4, and which has the axis P. Inner circumferential portions 3w of the inner ring body 3A and the fitting tubular portion 3B are formed so as to have a constant diameter, and constitute a fluid passage.

In a tip end side of an outer circumferential portion 3G of the inner ring body 3A, a flared portion 3f is formed, and the tip-contracted outer-circumferential flared surface 3a is formed in the tip end side of the flared portion 3f. In the basal end side of the flared portion 3f, a base-contracted outer circumferential portion 3c in which the diameter is further reduced as further advancing toward the basal end is formed. A maximum-diameter portion 3b which is a portion having the largest diameter is formed between the base-contracted outer circumferential portion 3c and the tip-contracted outer-circumferential flared surface 3a. Then, a trunk outer-circumferential portion (trunk outer-circumferential surface) 3*d* having a constant outer diameter is formed on the side of the base end of the base-contracted outer-circumferential portion 3*c*.

In the drawings of the application, the maximum-diameter portion 3*b* of the inner ring 3 is drawn to have a structure including a constant length in the direction of the axis P. Even in a structure corresponding to a boundary in which the maximum-diameter portion 3*b* is immediately changed to the tip-contracted outer-circumferential flared surface 3*a* and the base-contracted outer circumferential portion 3*c*, there is no technical difficulty.

The tip-contracted outer-circumferential flared surface 3*a* of the flared portion 3*f* is formed into a convex curved surface in which the whole is radially outwardly convex, the maximum-diameter portion 3*b* is formed in the basal end side of the tip-contracted outer-circumferential flared surface 3*a*, and the tip-contracted outer-circumferential flared surface 3*a* and the maximum-diameter portion 3*b* are press-inserted into the end portion 4C of the tube 4, whereby the end portion 4C of tube 4 is deformed in a flared manner.

In a tip end portion of the tip-contracted outer-circumferential flared surface 3*a*, a base-contracted cut-shaped deformation preventing portion 16 is formed in which the diameter is further reduced as further advancing toward the basal end of the axis P of the inner ring body 3A. The deformation preventing portion 16 can substantially suppress or prevent a tip end portion of the flared portion 3*f* from, after the tip-contracted outer-circumferential flared surface 3*a* is press-inserted into the end portion 4C of the tube 4, diameter-reducing, deforming, and projecting in the radial inward direction (toward the fluid passage). Furthermore, the deformation preventing portion 16 can prevent or suppress the tip end side of the outer-circumferential flared surface 3*a* from being further deformed and projected in the radial inward direction (toward the fluid passage) by the force and speed of the flow of the fluid.

In the fitting tubular portion 3B, a projecting cylindrical portion 14 which is press-inserted into the annular groove m of the pipe joint body 1, and an annular small projection 15 which is located in the radial inward side of the projecting cylindrical portion 14, and which includes an inclined outer circumferential surface 11 are formed. In a basal end portion of the annular small projection 15, a tip-contracted cut-shaped deformation preventing portion 17 is formed in which the diameter is further reduced as further advancing toward the tip end of the axis P of the inner ring body 3A. The deformation preventing portion 17 can prevent the basal end side portion of the annular small projection 15 from deforming and projecting in the radial inward direction (toward the fluid passage).

The portion between the base-contracted inclined outer circumferential surface 11 of the annular small projection 15 and the inner circumferential surface 14*a* of the projecting cylindrical portion 14 is formed into an annular recess in which the base is widened and configured so that a tip end portion of the small-diameter tubular portion 1*a* of the pipe joint body 1 is fitted into the recess, and fitting causes the inclined outer circumferential surface 11 of the annular small projection 15 and the inclined inner circumferential surface 5 of the small-diameter tubular portion 1*a* to be butted against each other.

In the tube 4, as shown in FIG. 1, the end portion 4C which is a basal end portion of the tube is press-fitted onto the inner ring body 3A. Because of this, a tip-contracted press contact portion 4*a* which is press-contacted with the tip-contracted outer-circumferential flared surface 3*a*, a maximum flared press-contact portion 4*b* which is press-contacted with the maximum-diameter portion 3*b*, a tip-expanded press-contact portion 4*c* which is press-contacted with the base-contracted outer circumferential portion 3*c*, and a trunk press-contact portion 4*d* which is press-contacted with the trunk outer circumferential portion 3*d* are formed in the end portion 4C.

In the state where the tube 4 is press-inserted into the inner ring 3, the diameter of an internal flow passage 4W configured by the inner circumferential surface 4A of the tube 4, that of the inner circumferential portion 3*w* constituting the fluid passage of the inner ring 3, and that of the inner circumferential surface 6 constituting the internal passage 6*w* of the pipe joint body 1 are set to have the same dimension and to be flush. However, the state is not limited to this.

After the inner ring body 3A is press-inserted into the end portion 4C of the tube 4, the tube is inserted and disposed into the pipe joint body 1. As shown in FIG. 1, then, the internal thread 13 of the union nut 2 is screwed with the external thread 7 of the tubular screwing portion 1A of the pipe joint body 1, and then turned in the fastening direction, thereby causing the union nut 2 to be screw-advanced toward the basal end along the axis Y (the axis Q in FIG. 3), and the pressing portion 12*b* of the union nut 2 to press the tip-end side outer circumferential surface (outer circumferential surface of the tip-contracted press-contact portion 4*a*) of the end portion 4C of the tube 4 in the direction of the axis Y (the axis Q in FIG. 3).

This pressing causes the projecting cylindrical portion 14 of the inner ring 3 to be press-inserted into the annular groove m of the pipe joint body 1, and the inclined outer circumferential surface 11 of the inner ring 3 to be butted against and press-contacted with the inclined inner circumferential surface 5 of the pipe joint body 1.

When the tube 4 having the inner ring 3 is inserted into and connected with the pipe-connecting device A as described above, the following first to third seal portions S1 to S3 are configured.

That is, the first seal portion S1 is a seal portion configured by: press contact between the tip-contracted press-contact portion 4*a* of the tube 4 and the tip-contracted outer-circumferential flared surface 3*a* of the inner ring body 3A; that between the maximum flared press-contact portion 4*b* of the tube 4 and the maximum-diameter portion 3*b* of the inner ring body 3A; that between the tip-expanded press-contact portion 4*c* of the tube 4 and the base-contracted outer circumferential portion 3*c* of the inner ring body 3A; and that between the trunk press-contact portion 4*d* of the tube 4 and the trunk outer circumferential portion 3*d* of the inner ring body 3A.

The second seal portion S2 is a seal portion configured by: press contact between the outer circumferential surface of the fitting tubular portion 3B of the inner ring 3 and the inner circumferential surface 9 in the basal end side of the tubular screwing portion 1A of the pipe joint body 1; and that between the inner circumferential surface of the fitting tubular portion 3B, specifically, the inner circumferential surface 14*a* of the projecting cylindrical portion 14 (an example of the seal element portion y) and the outer circumferential surface 10 of the small-diameter tubular portion 1*a* (an example of the seal configuring portion k) of the pipe joint body 1.

The third seal portion S3 is a seal portion configured by press contact due to mutual pressing in the direction of the axis Y between the inclined outer circumferential surface 11 of the annular small projection 15 (an example of the seal element portion y) of the inner ring 3, and the inclined inner circumferential surface 5 of the small-diameter tubular portion 1a of the pipe joint body 1.

When the first to third seal portions S1 to S3 are configured, the fluid flowing through the tube 4, the inner ring 3, and the pipe joint body 1 is prevented from, due to entering contact surfaces of the tube 4 and the inner ring 3 or those of the inner ring 3 and the pipe joint body 1, leaking from between the tubular screwing portion 1A of the pipe joint body 1 and the end portion 4C of the tube 4, and a perfect seal is attained.

When the first and second seal portions S1, S2 or the first and third seal portions S1, S3 function, the fluid does not leak from between the tubular screwing portion 1A of the pipe joint body 1 and the end portion 4C of the tube 4, and a satisfactory seal state is ensured. When all of the first to third seal portions S1 to S3 function, a more perfect seal can be ensured.

In the first seal portion S1, the press-contact portion between the tip-contracted press-contact portion 4a of the tube 4 and the tip-contracted outer-circumferential flared surface 3a of the inner ring body 3A, i.e., a tip-end press-contact portion is configured in the following manner.

Figure 6:
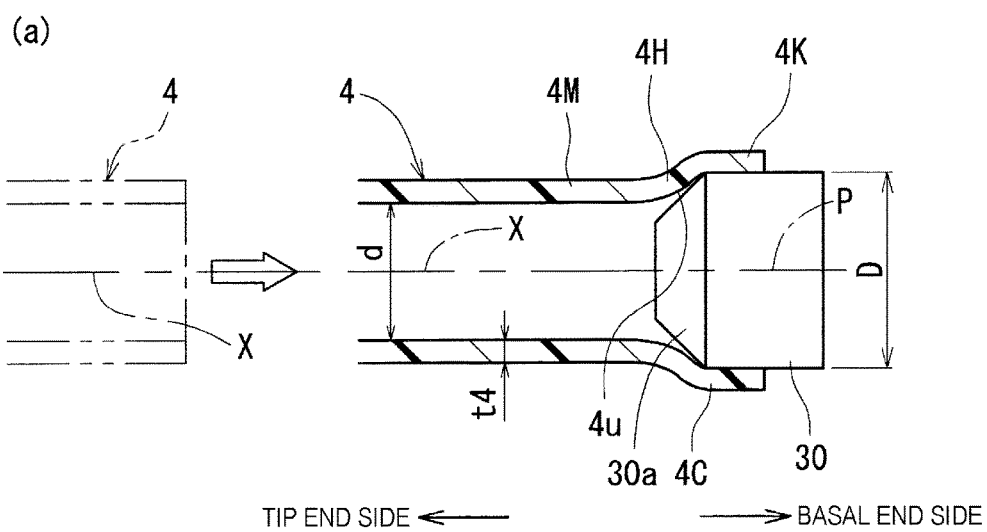
FIG. 6(a) is a sectional view showing a state of a naturally tip-contracted inner-circumferential flared surface of an inner circumferential portion of an end portion of the tube which appears as a result of that an end portion of the tube is flared and deformed by using a column that is formed so as to have the same diameter as a maximum-diameter portion of the inner ring.
FIG. 6(b) is an enlarged sectional view in the case where a tip-contracted outer-circumferential flared surface of the inner ring is press-inserted into the end portion of the tube to be flared and deformed.
Figure 6:
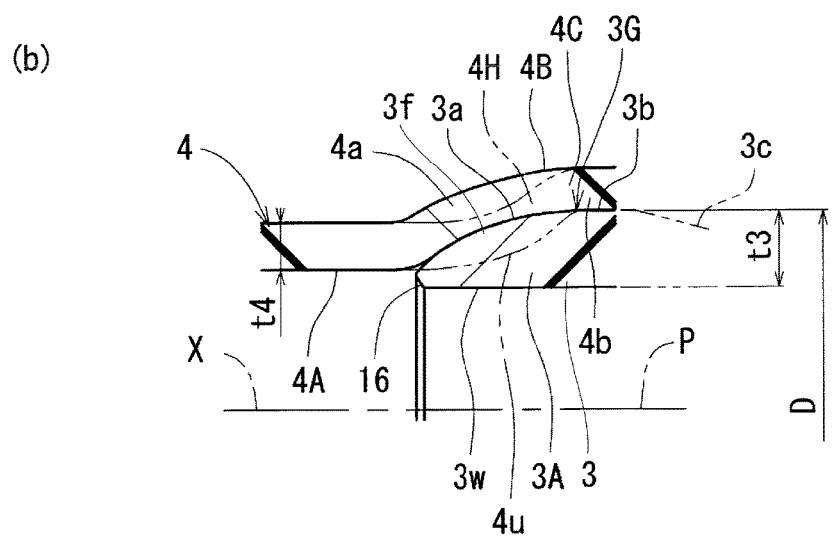

As shown in FIG. 1, namely, the whole of the tip-contracted outer-circumferential flared surface 3a of the inner ring body 3A is formed to have a diameter which, when the end portion 4C of the tube 4 is flared and deformed to the radial-direction dimension (in a state where only the maximum-diameter portion 3b exists) of the maximum-diameter portion 3b of the flared portion 3f of the inner ring body 3A, is larger than a natural tip-contracted inner circumferential flared surface 4u [the reference numeral 4u is shown in FIG. 6(a)] that appears at this time, and that is in the inner circumferential portion of the end portion 4C of the tube 4, and into a convex curved surface, and configured so as to press-contact the tip-contracted outer-circumferential flared surface 3a with the inner circumferential portion of the end portion 4C of the tube 4.

The natural tip-contracted inner circumferential flared surface 4u, and the tip-contracted outer-circumferential flared surface 3a which is larger in diameter than the tip-contracted inner circumferential flared surface 4u, and which is formed into a convex curved surface will be described with further reference to FIGS. 6(a) and 6(b).

In a column 30 shown in FIG. 6(a) and having a truncated conical portion 30a, the outer diameter D is formed to be equal to the diameter of the maximum-diameter portion 3b of the inner ring body 3A. The column 30 is press-inserted from the truncated conical portion 30a into the end portion 4C of the tube 4 which is not flared and deformed to have the inner diameter d, and which has the axis X, thereby flaring and deforming the end portion 4C of the tube 4. This causes the natural tip-contracted inner circumferential flared surface 4u to be formed between a flared portion 4K of the tube 4 and a diameter portion 4M of the tube 4 which is not flared and deformed.

Usually, the shape and dimensions of the natural tip-contracted inner circumferential flared surface 4u are varied depending on differences in material, thickness t4, flare amount [(D−d)/2], and the like of the tube 4. Each time when one of the material, thickness t4, and flare amount of the tube 4 is made different, the characteristics (shape and dimensions) of the tube are changed.

By contrast to the natural tip-contracted inner circumferential flared surface 4u, as shown in FIG. 6(b), the tip-contracted outer-circumferential flared surface 3a of the inner ring body 3A is formed into a curved surface in which the outline as seen in a section of the flared portion 3f taken along a plane extending along the axis P (axis X) is convex toward the radially outward side, i.e., a convex curved surface. The surface of the convex curved surface is a spherical surface which is the surface of a sphere, an elliptical spherical surface which is the surface of an elliptical sphere, or the like. The dimension of the outer diameter of the convex curved surface, i.e., that of the diameter of the tip-contracted outer-circumferential flared surface 3a is formed larger in all the direction of the axis P than that of the natural tip-contracted inner circumferential flared surface 4u. In FIG. 6(b), t3 indicates the thickness of the inner ring 3 in the maximum-diameter portion 3b.

Because of the existence of the tip-end press-contact portion, a wide range of the tip-contracted outer-circumferential flared surface 3a of the inner ring 3 is in contact with the inner circumferential portion of the end portion 4C of the tube 4, and a press-contact portion which is so wide as to extend over the whole of the tip-contracted outer-circumferential flared surface 3a can be formed between the tip-contracted outer-circumferential flared surface 3a and the inner circumferential portion of the tube 4.

Therefore, a further effect is attained in which, even when the inner ring 3 is press-inserted into the tube 4 while being somewhat inclined to each other, the press-contact portion which is formed between the end portion 4C of the tube 4 and the tip-contracted outer-circumferential flared surface 3a of the inner ring 3 is not interrupted, and a substantially whole of the portion in the circumferential direction is surely press-contacted, whereby a situation where the fluid penetrates therebetween from the tip end side of the tip-contracted outer-circumferential flared surface 3a can be effectively prevented from occurring.

In Embodiment 1, the tip-contracted outer-circumferential flared surface 3a of the inner ring body 3A is formed as a spherical convex curved surface so as to be relatively largely convex, and, because of the elasticity of the resin, the shape of a natural flared deformed portion 4H of the tube 4 is usually formed into a shape such as shown in FIG. 6(b) (a shape which is flared in a convex curved surface-like manner, as seen from the inner side of the tube). Therefore, the press contact force between the tip-contracted outer-circumferential flared surface 3a and the tip-contracted press contact portion 4a is set so that the force is larger as, advancing from a position of the end portion 4C of the tube 4 which is in contact with the maximum-diameter portion 3b of the inner ring 3, in the direction of the axis P of the convex curved surface along inner circumference of the tube, further approaching the intermediate value of the flare amount [(D−d)/2]. The convex curved surface constituting the tip-contracted outer-circumferential flared surface 3a of the inner ring body 3A is not limited to a spherical surface, and may be a smooth convex curved surface such as a catenary curved surface.

Even in the case where the natural flared deformed portion 4H is flared in a concave curved surface-like manner or in a linear manner, therefore, the tip-contracted outer-circumferential flared surface 3a and the tip-contracted press-contact portion 4a can be set to a press-contact state without increasing the dimension of the tip-contracted outer-circumferential flared surface 3a in the direction of the axis P.

Next, the pressing structure due to the union nut 2 in the first seal portion S1 will be described. As described above, the pressing portion 12b of the union nut 2 which clamps the tube 4 with the tip-contracted outer-circumferential flared surface 3a is formed into the inclined inner circumferential surface which is inclined in the same direction as the tip-contracted outer-circumferential flared surface 3a with respect to the axis Y of the tubular screwing portion 1A.

More specifically, the pressing angle θ which is the angle of the inclined inner circumferential surface 12b with respect to the axis Y (axis Q in FIG. 3) is set to be larger than a pressure receiving angle α which is the angle of the tip-contracted outer-circumferential flared surface 3a with respect the axis Y (axis P in FIG. 2) (θ>α). The minimum diameter r of the inclined inner circumferential surface 12b is set to be equal to or larger than the minimum diameter n of a press fitting portion M between the tip-contracted outer-circumferential flared surface 3a and the tube 4 (r≥n). In order to obtain a more satisfactory seal performance, it is preferred that the minimum diameter r of the inclined inner circumferential surface 12b and the minimum diameter n of the press fitting portion M are equal to each other.

Figure 7:
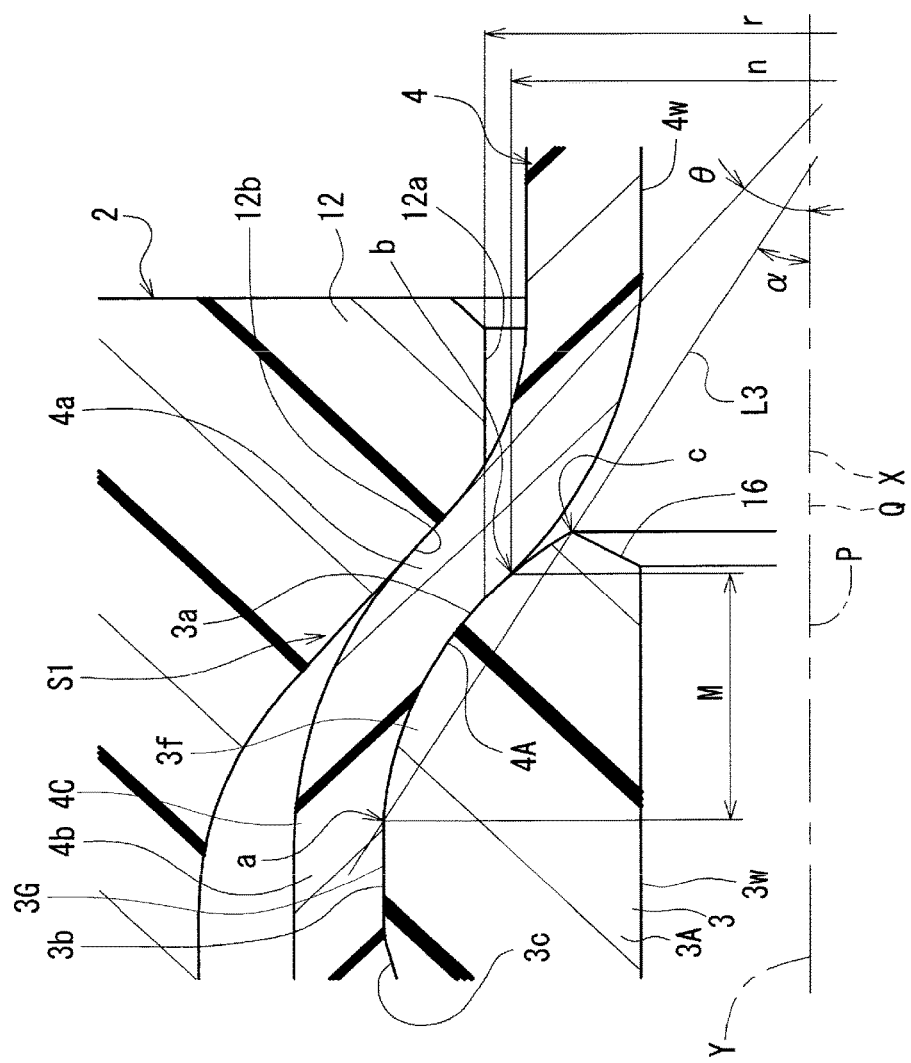
FIG. 7 is an enlarged sectional view showing main portions of a first seal portion.

In FIG. 7, the place where the end portion 4C of the tube 4 and the tip-contracted outer-circumferential flared surface 3a are press-contacted with each other, i.e., the portion where the both components 4C, 3a are in close contact with each other is defined as the press fitting portion M, the place where the press fitting portion M has the maximum diameter is referred to as a point a, the place where the portion has the minimum diameter is referred to as a point b, and the place where the tip-contracted outer-circumferential flared surface 3a has the minimum diameter (the boundary point with respect to the deformation preventing portion 16) is referred to as a point c. The pressure receiving angle α is an angle formed by a straight line L3 connecting the points a, c and the axis Y (axis P in FIG. 2), i.e., the average angle of the outer-circumferential flared surface 3a. Although not illustrated, the pressing angle θ is larger than an angle formed by a straight line connecting the points a, b and the axis Y (axis P in FIG. 2).

A diameter related to the axis Y (axis Q in FIG. 3) of the inner circumferential surface 12a of the flange portion 12, i.e., the minimum diameter r of the inclined inner circumferential surface 12b is set to be equal to or larger than a diameter related to the axis Y (axis Q in FIG. 3) of the point b, i.e., the minimum diameter n of the press fitting portion M (r≥n).

In the tip-end press-contact portion, by fastening (screw advancement) caused by turning of the union nut 2, the inclined inner circumferential surface 12b is caused to press in the direction of the axis Y the tip-contracted press-contact portion 4a which is press-contacted with and fitted onto the tip-contracted outer-circumferential flared surface 3a. In this configuration, the tube 4 is pressed by a wide surface. Therefore, the pressure (surface pressure) of the portion which presses the tube 4 can be explicitly reduced as compared with the conventional structure where pressing is performed by a pointed edge (see "pressing edge 3C" in FIGS. 1 and 2 of Patent Literature 1). Consequently, it is possible to reduce the creep phenomenon.

In summary, the seal performance and the security against the slipping off of the tube are not impaired, and a strong fastening work is not required. Therefore, the workability is largely improved, and the deformation can be suppressed to the minimum level (or as far as possible), whereby the life of a product can be prolonged.

According to the pipe-connecting device A of Embodiment 1, because of the above-described configuration of the tip-end press-contact portion, the tip-contracted outer-circumferential flared surface 3a of the inner ring 3 and the end portion 4C of the tube 4 are already in close contact with each other prior to fastening of the union nut 2. Even when the pressing force applied by the union nut 2 is weaker than that in the prior art, therefore, sufficient seal and tube slipping-off preventing performances are obtained in the first seal portion S1. Consequently, the deformation of the end portion 4C of the tube 4 due to pressing can be reduced (minimized).

According to the pipe-connecting device A of Embodiment 1, the pressing angle θ is set to be larger than the pressure receiving angle α. In the portion which is in the tip-contracted press-contact portion 4a, and which is pressed by the inclined inner circumferential surface 12b, therefore, the amount of compression is further increased as closer to the side opposite to the pipe joint body 1 in the direction of the axis Y (axis X), whereby a wedge action is produced, and the effect of preventing the tube 4 from slipping off can be further enhanced.

When a pulling force in the direction of extracting the tube 4 from the pipe joint body 1 acts on the tube, namely, the tube 4 is more strongly clamped between the inner ring 3 which is conjointly pulled, and the inclined inner circumferential surface 12b. In the tube 4, therefore, a wedge action is produced also in the pulling direction.

The minimum diameter r of the inclined inner circumferential surface 12b is set to be equal to or larger than the minimum diameter n of the press fitting portion M which is the portion where the tip-contracted outer-circumferential flared surface 3a and the tube 4 are in close contact with each other. Therefore, a wasted operation of pressing a portion where the tip-contracted outer-circumferential flared surface 3a and the end portion 4C of the tube 4 are not in close contact with each other, i.e., an unnecessary pressing force is not applied. The fastening due to fastening of the union nut 2 can be efficiently performed. In other words, the union nut 2 can be fastened by a force which is smaller than that in the prior art.

In this case, when a configuration where θ>α and r≥n is employed, in the portion of the inclined inner circumferential surface 12b which is caused to press the end portion 4C of the tube 4 by screw advancement of the union nut 2, the part which applies the strongest pressing force is in the vicinity of or in the minimum-diameter portion in the press fitting portion M. Therefore, there is an advantage that the effect of preventing slipping off of the tube 4 by the wedge action, and that of reducing the force of fastening the union nut 2 are synergistically enhanced.

In addition, the device is configured so that inner seal portions due to press contact between the seal element portion y which is formed in the basal end side of the inner ring 3, and the seal configuring portion k which is disposed in the pipe joint body 1, i.e., the second seal portion S2 and the third seal portion S3 can be formed. Therefore, sure sealing can be realized by a cooperation of the second and third seal portions S2, S3 and the first seal portion S1.

The inclined inner circumferential surface 12b of the union nut 2 is configured as a tapered surface as described above, or alternatively may be configured as an arcuate surface which forms a surface contact along the outer circumferential surface of the tip-contracted press contact portion 4a in the end portion 4C of the tube 4 that covers the tip-contracted outer-circumferential flared surface 3a of the inner ring 3.

Embodiment 2

As shown in FIG. 5, a pipe-connecting device A of Embodiment 2 is different from the pipe-connecting device A of Embodiment 1 only in the configuration of the fitting tubular portion 3B.

In the fitting tubular portion 3B of the inner ring 3, namely, the outer circumferential surface 3e, the inner circumferential portion 3w, and a base-expanded inner circumferential surface 20 in which the diameter is further made larger as further advancing toward the basal end side are formed. In the pipe joint body 1, by contrast, the tip-contracted small-diameter tubular portion 1a having an outer circumferential surface 18 which is inclined so that the diameter is further reduced as advancing toward the tip end is formed on the radially inward side of the basal end side of the tubular screwing portion 1A. A tip-expanded annular groove 19 into which the basal end portion of the fitting tubular portion 3B is fitted is formed between the outer circumferential surface 18 of the tip-contracted small-diameter tubular portion 1a and the inner circumferential surface 9 of the tubular screwing portion 1A.

In the tip end portion of the small-diameter tubular portion 1a, the tip end side of the small-diameter tubular portion 1a is deformed and projected in the radial inward direction (toward the fluid passage 6w), thereby forming a tip-expanded cut-shaped deformation preventing portion 21 for preventing the fluid from entering and staying.

In the case of the pipe-connecting device A of Embodiment 2, when the union nut 2 is screw-advanced to the tubular screwing portion 1A of the pipe joint body 1, the tip-end side outer circumferential surface (outer circumferential surface of the tip-contracted press-contact portion 4a) of the end portion 4C of the tube 4 is pressed in the direction of the axis Y by the pressing portion 12b of the union nut 2.

This causes the basal end portion of the fitting tubular portion 3B of the inner ring 3 to be press-inserted into the annular groove 19 of the pipe joint body 1, and the tip-contracted outer circumferential surface 18 (an example of the seal configuring portion k) of the pipe joint body 1 and the base-expanded inner circumferential surface 20 (an example of the seal element portion y) of the inner ring 3 to be butted against and press-contacted with each other in the direction of the axis Y, and the second seal portion (an example of the inner seal portion) S2 is configured.

In order to enable the second seal portion S2 to perfectly function, i.e., in order to prevent the basal end portion of the fitting tubular portion 3B from being butted against the bottom surface (outer circumferential surface 18) of the annular groove 19 to cause the base-expanded inner circumferential surface 20 to enter a state where the inner circumferential surface is not press-contacted with the outer circumferential surface 18 of the tubular screwing portion 1A, it is preferred that the end surface of the basal end portion of the fitting tubular portion 3B is formed into a cut-shaped butting avoiding portion 25.

When a pulling force in the direction of extracting the tube 4 from the pipe joint body 1 acts on the tube, in the second seal portion S2 in Embodiment 2, the base-expanded inner circumferential surface 20 and the outer circumferential surface 18 separate from each other, and there is a possibility that the sealing function is lowered or deactivated. By contrast, the second seal portion S2 in Embodiment 1 configured by the press fitting of the projecting cylindrical portion 14 and the annular groove m is advantageous in that, even when the projecting cylindrical portion 14 is somewhat pulled and moved in conjunction with the pulled movement of the tube 4, the press fitting state of the annular groove m and the projecting cylindrical portion 14 is maintained, and therefore the sealing function is ensured.

The connection of the tube 4 and the pipe joint body 1 by using the inner ring 3 in the pipe-connecting device A of Embodiment 2 is similar to that in the configuration of the pipe-connecting device A of Embodiment 1 shown in FIGS. 3 and 4 except the configuration of the second seal portion S2 (the inner seal portion). Therefore, the reference numerals in FIG. 1 are used also in FIG. 5, and their description is omitted.

Other Embodiments

It is assumed that the fluid transfer tube 4 which is a sealing object in the pipe-connecting device A includes a tube-like portion (tubular screwing portion 1A) that is projected from another pipe joint body, or a fluid apparatus such as a pump or a valve. In the pipe-connecting device A of the invention, a fluid apparatus 1 may be used as a component element in place of the pipe joint body 1. Namely, pumps, valves, and the like in which the tubular screwing portion 1A is integrated with a case are generally defined as fluid apparatuses 1.

The pressing portion 12b which is shown in FIGS. 1, 3, and 5 is an inclined surface having a constant inclination (linear). Alternatively, the portion may be a concave curved surface which is bent similarly with the tip-contracted outer-circumferential flared surface 3a, or a convex curved surface which is slightly bent in the opposite direction. In the case of a curved surface, the average angle of the surface with respect to the axis Q is the pressing angle θ.

DESCRIPTION OF REFERENCE NUMERALS 1 pipe joint body (fluid apparatus)
1A tubular screwing portion
2 union nut
3 inner ring
3G outer circumferential portion
3a tip-contracted outer-circumferential flared surface
3w inner circumferential portion
4 tube
4C end portion
4u natural tip-contracted inner circumferential flared surface
7 external thread
12b pressing portion (inclined inner circumferential surface)
13 internal thread
M press fitting portion
S2, S3 inner seal portion
Y axis
k seal configuring portion
n minimum diameter of press fitting portion
r minimum diameter of pressing portion
y seal element portion
θ angle of inclined inner circumferential surface with respect to axis
α angle of outer-circumferential flared surface with respect to axis

The invention claimed is:
1. A pipe-connecting device comprising:
an inner ring having: an inner circumferential portion constituting a fluid transfer path; and, an outer circumferential portion in which an outer-circumferential flared surface that is to be press-inserted from a tip end into an end portion of a fluid transfer tube to flare an inner circumferential portion of the end portion of the tube is formed at the tip end;
a pipe joint body or fluid apparatus that has a tubular screwing portion in which an external thread is formed on an outer circumferential side; and a union nut in which an internal thread that is screwed with the external thread of the tubular screwing portion is formed, the inner ring is inserted into the tubular screwing portion in a state where the inner circumferential portion of the end portion of the tube is flared, and the outer-circumferential flared surface is pressed against the union nut, which is screwed with the external thread of the tubular screwing portion, in a state where the tube is clamped, wherein the outer-circumferential flared surface is formed into a convex curved surface in which the whole is radially outwardly convex, a pressing portion, which is in the union nut and which presses the tube against the outer-circumferential flared surface, is formed into an inclined inner circumferential surface, which is inclined in a same direction as the outer-circumferential flared surface with respect to an axis of the tubular screwing portion, prior to fastening of the union nut, wherein a press fitting portion is an area of engagement between the outer-circumferential flared surface of the inner ring and the end portion of the tube, said press fitting portion having a minimum diameter and a maximum diameter;

wherein an acute angle of the inclined inner circumferential surface with respect to the axis of the tubular screwing portion is set to be larger than an angle formed by a straight line connecting a place where the pressing fitting portion has the maximum diameter and a place where the outer-circumferential flared surface has the minimum diameter, and the axis of the tubular screwing portion;

and wherein a minimum diameter of the inclined inner circumferential surface of the union nut is set to be equal to or larger the minimum diameter of the press fitting portion, and the minimum diameter of the inclined inner circumferential surface of the union nut is set to be equal to or smaller than the maximum diameter of the press fitting portion;

wherein the inner ring is held in and abuts a recess of the pipe joint body or fluid apparatus, where the recess is radially offset from the fluid transfer path.

2. The pipe-connecting device according to claim 1, wherein the outer-circumferential flared surface of the inner ring is formed such that, in the inner circumferential portion of the end portion of the tube to be flared, a portion of the tube that is to be flared is formed into a state having a diameter that is larger than a natural diameter of the inner circumferential flared surface of the tube, so as to form a convex curved surface.

3. The pipe-connecting device according to claim 1, further comprising a seal element portion, which is formed in a basal end side of the inner ring, and a seal configuring portion, which is disposed in the pipe joint body or the fluid apparatus, and wherein the device is configured so that inner seal portions are formed as a result of press contact between the seal element portion and the seal configuring portion.

* * * * *